D. Talbot,
Saw.
N° 30,265.　　　　　Patented Oct. 2, 1860.
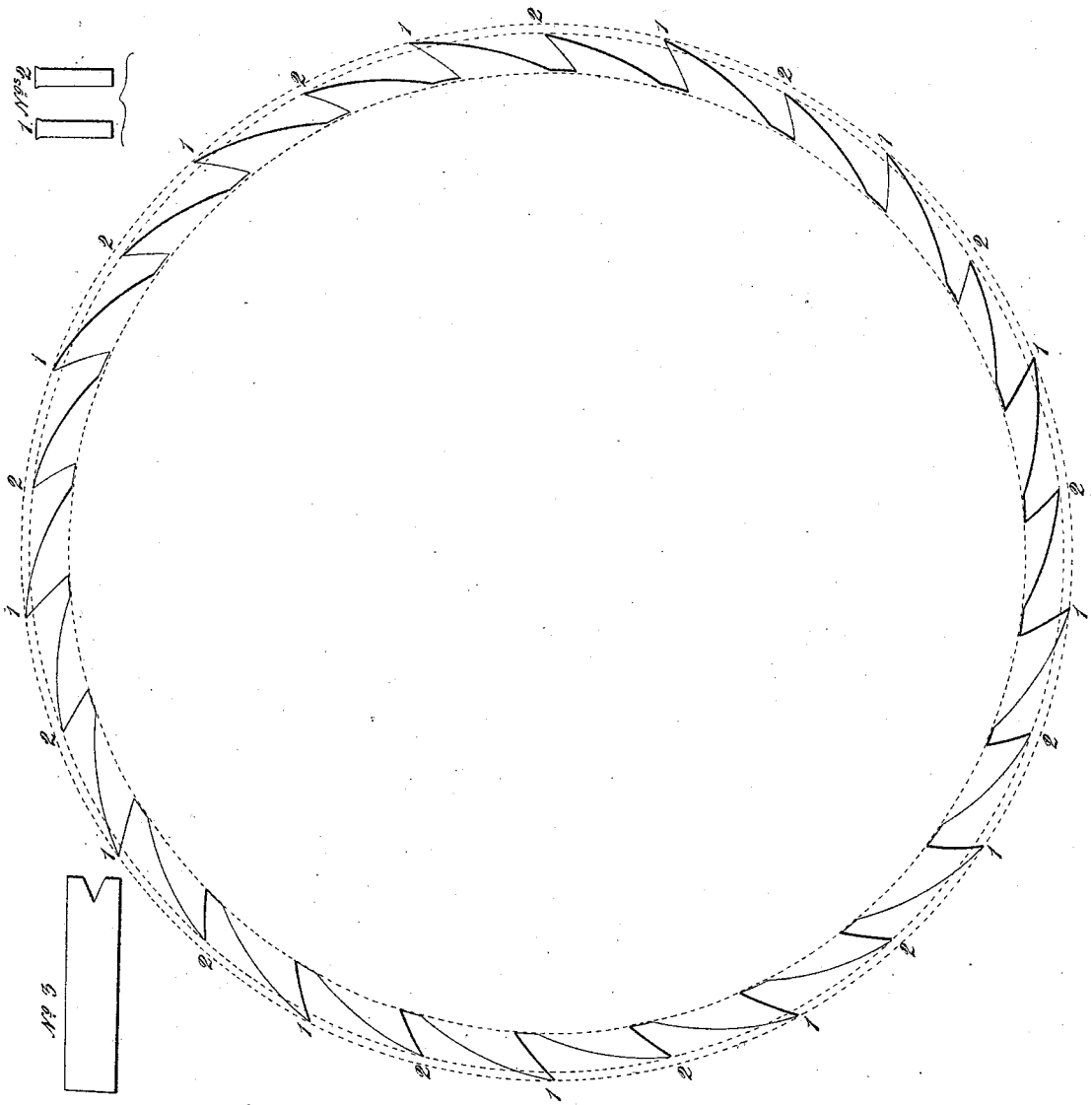
Witnesses
Wm Crotenden Bradford
Thomas Jackman
Inventor
Darwin Talbot

UNITED STATES PATENT OFFICE.

DARWIN TALBOT, OF IRONTON, MISSOURI.

SAW.

Specification of Letters Patent No. 30,265, dated October 2, 1860.

*To all whom it may concern:*

Be it known that I, DARWIN TALBOT, of the city of Ironton, in the county of Iron, in the State of Missouri, have invented a new and Improved Mode of Sharpening and Setting Circular and Vertical Saws; and I do declare that the following is a full and exact description thereof, reference being had to the drawings accompanying my specification.

The nature of my invention consists in allowing every tooth of the saw to remain straight with the saw plate. Every alternate tooth is an eighth or eighth and sixteenth of an inch shorter than the other. The long teeth have but the least perceptible spread at the point; the short teeth are sufficiently spread or braded at the points to cut the required width of channel. By this process the channel is first cut narrow by the long teeth; then the desired width by the short teeth with an expenditure of one-half or one-third the power required when all the teeth cut the same width of channel.

I do not claim as new the having every alternate tooth shorter; nor do I claim as new brading the points of teeth; but

I claim—

Combining alternate long and short teeth, when the former are narrower at their cutting points than the latter, both being made as hereinbefore described.

DARWIN TALBOT.

Witnesses:
 JAMES ROBISON,
 BENJAMIN F. ROBISON.